(12) United States Patent
Komorkiewicz et al.

(10) Patent No.: US 11,610,407 B2
(45) Date of Patent: Mar. 21, 2023

(54) VEHICLES, SYSTEMS, AND METHODS FOR DETERMINING AN ENTRY OF AN OCCUPANCY MAP OF A VICINITY OF A VEHICLE

(71) Applicant: Aptiv Technologies Limited, St. Michael (BB)

(72) Inventors: Mateusz Komorkiewicz, Cracow (PL); Daniel Dworak, Tarnów (PL); Mateusz Wojcik, Cracow (PL); Filip Ciepiela, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 280 days.

(21) Appl. No.: 17/105,211

(22) Filed: Nov. 25, 2020

(65) Prior Publication Data

US 2021/0165093 A1    Jun. 3, 2021

(30) Foreign Application Priority Data

Dec. 3, 2019  (EP) .................................... 19213307
Oct. 27, 2020  (EP) .................................... 20204096

(51) Int. Cl.

| | | |
|---|---|---|
| *G06V 20/58* | (2022.01) | |
| *G06T 7/11* | (2017.01) | |
| *G06T 7/70* | (2017.01) | |
| *G01S 13/04* | (2006.01) | |
| *G01S 13/86* | (2006.01) | |

(Continued)

(52) U.S. Cl.
CPC .............. *G06V 20/58* (2022.01); *G01S 13/04* (2013.01); *G01S 13/867* (2013.01); *G01S 13/89* (2013.01); *G06N 3/045* (2023.01);

*G06N 3/08* (2013.01); *G06T 7/11* (2017.01); *G06T 7/70* (2017.01); *G06V 10/80* (2022.01);

(Continued)

(58) Field of Classification Search
None
See application file for complete search history.

(56) References Cited

U.S. PATENT DOCUMENTS

2020/0074266 A1*  3/2020  Peake ................. G05D 1/0231
2020/0326420 A1*  10/2020  Swaminathan .......... G06T 7/70

(Continued)

OTHER PUBLICATIONS

"Extended European Search Report", EP Application No. 19213307.2, dated Jun. 8, 2020, 9 pages.

(Continued)

*Primary Examiner* — Leon Viet Q Nguyen
(74) *Attorney, Agent, or Firm* — Sawtooth Patent Group PLLC

(57) ABSTRACT

A computer implemented method for determining an entry of an occupancy map of a vicinity of a vehicle comprises the following steps carried out by computer hardware components: acquiring first sensor data of a first sensor of the vicinity of the vehicle; acquiring second sensor data of a second sensor of the vicinity of the vehicle; determining a first sensor data portion of the first sensor data which corresponds to a potential object in the vicinity of the vehicle; based on the first sensor data portion, determining a second sensor data portion of the second sensor data which corresponds to a location of the potential object; and determining an entry of the occupancy map based on the first sensor data portion and the second sensor data portion.

20 Claims, 5 Drawing Sheets

(51) Int. Cl.
  *G01S 13/89* (2006.01)
  *G06N 3/08* (2023.01)
  *G06N 3/045* (2023.01)
  *G06V 10/80* (2022.01)

(52) U.S. Cl.
  CPC ............ *G06T 2207/20081* (2013.01); *G06T 2207/20084* (2013.01); *G06T 2207/30252* (2013.01)

(56) References Cited

U.S. PATENT DOCUMENTS

2020/0410274 A1* 12/2020 Satoh .................. G06T 11/00
2021/0064890 A1*  3/2021 Murveit ............... G06V 10/811
2021/0334556 A1* 10/2021 Vignard ............... G06V 10/22

OTHER PUBLICATIONS

Balazs, et al., "Convolutional Neural Network Information Fusion based on Dempster-Shafer Theory for Urban Scene Understanding", Nov. 2019, 10 pages.

Bauer, et al., "Deep, spatially coherent Occupancy Maps based on Radar Measurements", Mar. 29, 2019, 6 pages.

Feng, et al., "Applying Neural Networks with a High-Resolution Automotive Radar for Lane Detection", Mar. 2019, 6 pages.

Galvez, et al., "Grid-Based Multi-Sensor Fusion for On-Road Obstacle Detection: Application to Autonomous Driving", Degree Project, in Computer Science , Second Level Stockholm, Sweden 2015, Aug. 2015, 158 pages.

Kocic, et al., "Sensors and Sensor Fusion in Autonomous Vehicles", Nov. 2018, 4 pages.

Mohajerin, et al., "Multi-Step Prediction of Occupancy Grid Maps with Recurrent Neural Networks", Jan. 22, 2019, 9 pages.

Oh, et al., "Fast Occupancy Grid Filtering Using Grid Cell Clusters from LIDAR and Stereo Vision Sensor Data", Oct. 1, 2016, 9 pages.

Schreiber, et al., "Long-Term Occupancy Grid Prediction Using Recurrent Neural Networks", Jun. 7, 2019, 8 pages.

Vora, et al., "PointPainting: Sequential Fusion for 3D Object Detection", May 6, 2020, 11 pages.

Zhong, et al., "Camera Radar Fusion for Increased Reliability in ADAS Applications", Jan. 2018, 4 pages.

"Extended European Search Report", EP Application No. 20204096.0, dated Apr. 15, 2021, 8 pages.

* cited by examiner

VEHICLES, SYSTEMS, AND METHODS FOR DETERMINING AN ENTRY OF AN OCCUPANCY MAP OF A VICINITY OF A VEHICLE

CROSS-REFERENCE TO RELATED APPLICATIONS

This application claims priority to European Patent Application Number 20204096.0, filed Oct. 27, 2020, which in turn claims priority to European Patent Application Number 19213307.2, filed Dec. 3, 2019, the disclosures of which are hereby incorporated by reference in their entireties herein.

TECHNICAL FIELD

The present disclosure relates to vehicles, systems, and methods for determining an entry of an occupancy map of a vicinity of a vehicle.

BACKGROUND

An occupancy grid (OG, which may also be referred to as occupancy map grid or occupancy map) is a map of cells (for example with fixed width and height) containing information (for example a probability) of the cell being occupied by some kind of object. Variations of the Dempster-Shafer (DS) theory are commonly used for determining the occupancy grid map.

Occupancy grids are widely used in advanced driver assistance systems and autonomous driving, as an occupancy grid can be interpreted as a map of obstacles (wherein an occupied cell is a not drivable area) around the vehicle. There are several high level functions such traffic jam assist or collision avoidance with overtaking which require an occupancy grid as input information.

Accordingly, there is a need for efficient and reliable methods and systems for determining an occupancy grid.

SUMMARY

The present disclosure provides a computer implemented method, a computer system, a vehicle, and a non-transitory computer readable medium according to the independent claims. Embodiments are given in the subclaims, the description and the drawings.

In one aspect, the present disclosure is directed at a computer implemented method for determining an entry of an occupancy map of a vicinity of a vehicle, the method comprising the following steps carried out by computer hardware components: acquiring first sensor data of (in other words: acquired by) a first sensor of the vicinity of the vehicle; acquiring second sensor data of (in other words: acquired by) a second sensor of the vicinity of the vehicle; determining a first sensor data portion of the first sensor data which corresponds to a potential object (for example a building, tree, other vehicle, or pedestrian) in the vicinity of the vehicle; based on the first sensor data portion, determining a second sensor data portion of the second sensor data which corresponds to a location of the potential object; and determining an entry of the occupancy map based on the first sensor data portion and the second sensor data portion.

In other words, if in first sensor data acquired by a first sensor a potential object is detected (in other words: it is determined that an object is potentially present, or present with a high probability), then a portion of second sensor data acquired by a second sensor is determined corresponding to the portion of the first sensor data which represents the potential object, and one or more entries of an occupancy grid map are determined based on the respective portions of the first and second sensor data. The first sensor data portion and the second sensor data portion may represent at least substantially the same area (in 2D or 3D) of the vicinity of the vehicle.

It will be understood that the occupancy map may be represented by a matrix (for a two-dimensional occupancy map) or a tensor (for a three-dimensional occupancy map), wherein each of the two dimensions of the matrix (or each of the three dimensions of the tensor) corresponds to a dimension in space (in a plane for the 2D occupancy map and in three-dimensional space for the 3D occupancy map). The value (in other words: entry) of the matrix or tensor at a specific row or column (or generally position) may correspond to information whether or not an object is (potentially) present at that location, and may be presented by a Boolean value (for example "true" for object present, or "false" for object not present), or by a value corresponding to a probability of an object being present (for example a number indicating the probability between 0 and 1 (or between 0% and 100%), or a fuzzy value, like "not present", "most probably not present", "most probably present", or "present"), or an indication that no information on the presence of an object is available. Furthermore, different objects may be represented by different values or entries of the occupancy grid, for example a specific value for moving objects and another value for non-moving objects, or different values for buildings, vehicles, or pedestrians.

The first sensor data portion may also be referred to as a patch. A patch may be a (spatially) connected (proper) subset (of the first sensor data), for example a crop of an image, or a subset of spatially neighboring radar measurements.

The second sensor data portion may be a (spatially) connected (proper) subset (of the second sensor data), for example a crop of an image, or a subset of spatially neighboring radar measurements.

Determining the entry of the occupancy map may include determining more than only one entry of the occupancy map (i.e. the entries of more than one cell of the occupancy map). For example, a patch of the occupancy map (corresponding to the locations to which the first sensor data portion (and accordingly the second sensor data portion) correspond, may be determined. For example, once the patch is determined, it may be determined where in the occupancy map the patch is to be included. For example, the patch may be included at a position in the occupancy map which is determined based on the position of the vehicle and a determined distance and angle (relative to the vehicle) of the (potential) object, or for example the patch may be included at a position in the occupancy map so that it fits to previously determined entries of the occupancy map.

According to another aspect, the first sensor comprises a radar (radio detection and ranging) sensor. According to another aspect, the second sensor comprises a camera.

It has been found that using radar data as first sensor data and image data as second sensor data provides data for a reliable determination of the occupancy map (or of entries of the occupancy map). For example, the radar sensor data may be used to determine where an object may potentially be located, and a portion of the image data that corresponds to this location may be used together with the radar data to determine the entry of the occupancy map.

According to another aspect, the first sensor data comprises a plurality of measurements of the first sensor stacked over time, and the second sensor data comprises a plurality of measurements of the second sensor stacked over time. Alternatively, the first sensor data comprises a plurality of measurements of the first sensor which have been processed by a first (artificial) neural network and stacked over time, and/or the second sensor data comprises a plurality of measurements of the second sensor which have been processed by a second (artificial) neural network and stacked over time. For example, when the first sensor comprises a radar sensor, the first artificial neural network may be referred to as a radar patch network. For example, when the second sensor comprises a camera, the second artificial neural network may be referred to as a camera patch network.

By stacking the sensor data, the sensor data acquired at various instances of time (in other words: points of time) may be combined into one data set, so that more reliable information compared to the sensor data of only one instance of time, is available.

According to another aspect, the computer implemented method further comprises the following steps carried out by the computer hardware components: determining a segmented image based on the second sensor data (which may be an input camera image); and determining a segmented image portion of the segmented image; wherein the entry of the occupancy map is determined further based on the segmented image portion. It will be understood that the entire second sensor data may be segmented, or that only the second sensor data portion may be segmented to obtain the segmented image portion. The segmented image portion may include pixels corresponding to pixels of the second sensor data portion (in other words: may have the same size or dimensions and correspond to the same location in the second sensor data).

The segmented image portion may have the same dimensions as the second sensor data portion. The second sensor data portion and the segmented image portion may be concatenated (so that the concatenation may be used instead of the second sensor data portion).

It has been found that using a segmented image for determining the entry of the occupancy map may improve the occupancy mag determination.

According to another aspect, the segmented image is determined using a third neural network.

According to another aspect, the first sensor data portion comprises a first sensor patch of a pre-determined first sensor data portion size, the second sensor data portion comprises a second sensor patch of a pre-determined second sensor data portion dimension size.

For example, if the first sensor data or second sensor data are represented by matrices, the dimension size may refer to number of columns or number of rows.

According to another aspect, the first sensor data portion size and the second sensor data portion size are multi-dimensional data with identical size in at least one dimension.

According to another aspect, the multi-dimensional data comprises dimensions related to time, width, height, and features, wherein the multi-dimensional data of the first sensor data portion size and the multi-dimensional data of the second sensor data portion have identical size in the dimensions related to width and height.

This may allow combining the multi-dimensional data of the first sensor data portion and the multi-dimensional data of the second sensor data portion to a combined data set. It has been found that using a combined data set enhances results when the data set is processed using an artificial neural network.

According to another aspect, the second sensor data portion is determined so that an area in the vicinity of the vehicle covered by the second sensor data portion is related to an area in the vicinity of the vehicle covered by the first sensor data portion.

According to another aspect, the second sensor data portion is determined based on mapping corner points of the first sensor data portion to the second sensor data. Determining the second sensor data portion may further include determining a related portion of the second sensor data based on the mapped corner points, and determining the second sensor data portion based on resizing the related portion.

According to another aspect, the second sensor data portion is determined based on mapping every point of the first sensor data portion to the second sensor data.

According to another aspect, the entry of the occupancy map is determined using an artificial neural network based on the first sensor data portion and the second sensor data portion.

It has been found that with the (artificial) neural network based low-level fusion method (for example camera-radar low level fusion method), the occupancy grid may be determined efficiently and reliably.

According to another aspect, the artificial neural network is trained based on at least one of manually labelled occupancy grid map data or based on occupancy grid map data determined based on a third sensor.

The method may provide a computationally efficient, artificial neural network based camera-radar low level fusion occupancy grid determination method.

The method provides a neural network based approach, for example for camera-radar fusion (or radar-camera fusion). For example, radar-camera fusion may be provided on low level and the fusion may be processed in patches (rather than globally).

In another aspect, the present disclosure is directed at a computer system, said computer system comprising a plurality of computer hardware components configured to carry out several or all steps of the computer implemented method described herein.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle, comprising: the computer system as described above, the first sensor, and the second sensor.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an interne connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

According to various embodiments, an occupancy grid map may be determined (in other words: the entries of an occupancy grad may be determined) by accumulating readings from various sensors (for example radar, camera, LIDAR (light detection and ranging)) and transforming the accumulated readings to probabilities over time.

According to various embodiments, machine learning methods, for example artificial neural network (which may in short also be referred to as neural network, for example a recurrent neural network or a long short term memory network) may be used to determine the occupancy grid. The input to the neural network may be raw data from the sensors. Fusion on the low level may be provided which results in increased performance. Central ADAS (advanced driver assistance systems)/AD (autonomous driving) control ECUs (electronic control units) may be used to receive both radar detections and camera video stream to provide the low level fusion.

Figure 1:
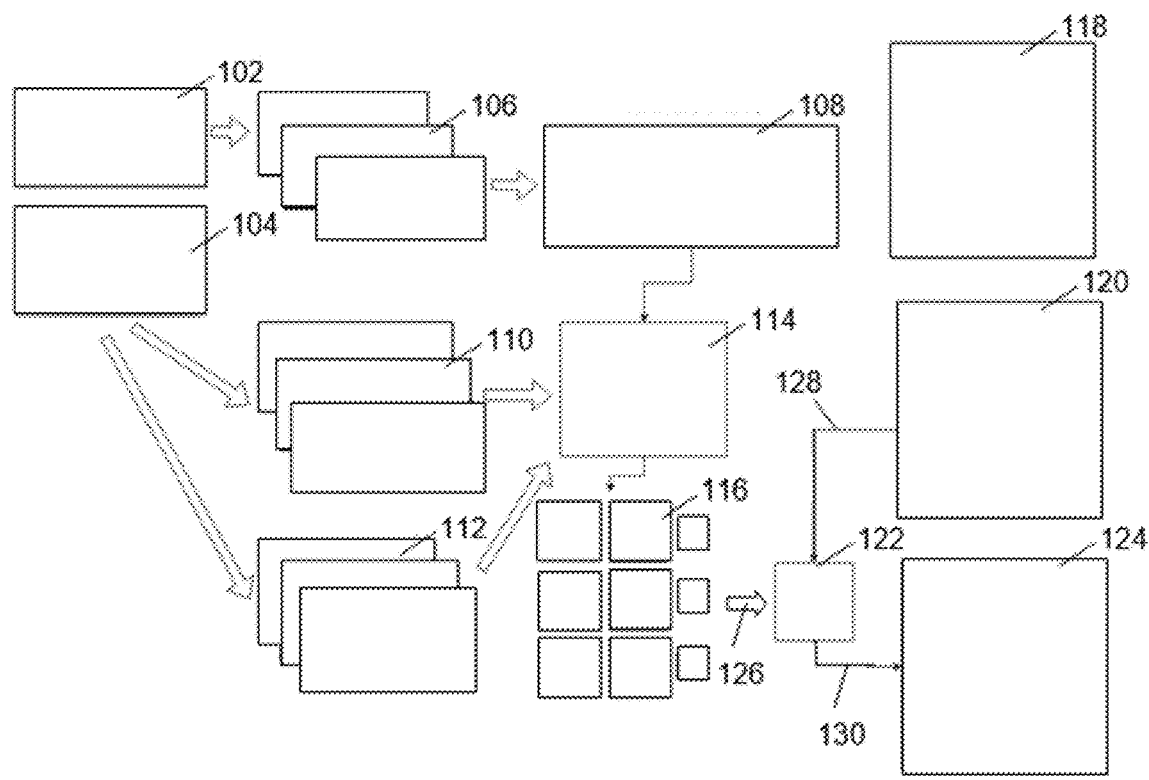
FIG. 1 an illustration of camera-radar fusion for determination of an occupancy map using a neural network according to various embodiments.

FIG. 1 shows an illustration 100 of camera-radar fusion for determination of an occupancy map using a neural network according to various embodiments.

The data 104 provided by the camera and radar sensors (for example with front coverage or with 360 degree coverage) may be stacked in time, so as to obtain stacked radar detections 110 and stacked camera images 112. For every valid radar detection, a surrounding patch of N×W×H×C size is cut out (of the stacked radar detections 110), where N is the number of stacked readouts, W×H is the patch grid size (W is the width, h is the height), and C is the number of feature channels (detection presence, speed etc.), like indicated by block 114.

Furthermore, a corresponding 2D patch from the camera image (in other words: the stacked camera images 112) is prepared. An index R is used for radar data, and an index C for camera data for each of the variables N and C.

For example, camera/radar calibration matrices allowing mapping of 3D radar detections (x, y and z coordinates, z=0 if no elevation from radar is available) to the corresponding 2D point on the image plane may be used.

Both patches (i.e. the radar patch and the image patch) may be aligned, for example by using one of the following methods.

In a first method for aligning, which may be faster than the second method, pixel position of (for example four) corner points of the radar patch may be calculated on the image plane, and the bounding box covering all (for example four) markers may be cut. The image patch may be brought to the same size as radar patch by using an image resize operation.

In a second method for aligning, which may be computationally more expensive than the first method, but which may provide better results, every point (x, y, z) may be mapped separately from radar grid to the image plane. Once all the pixel positions for a radar grid are known, an image warping technique (with or without interpolation or other depth completion technique) may be applied to obtain the final image patch, which may be well-aligned with the radar patch.

Based on the above, both the radar patch (of size $N_R \times W \times H \times C_R$) as well as the camera patch (of size $N_C \times W \times H \times C_C$) may have the same spatial size (W×H). However, the temporal and channel size may differ. The data from both sensors may be reshaped for concatenating, to incorporate the temporal channel into the feature channel (W×H×N*C). This may result in both patches having the size which allows for concatenation (W×H×($N_R*C_R+N_C*C_C$)).

To efficiently train the neural network, the ground truth labels may be required. According to various embodiments, a method for efficient data labelling is provided, which may improve the training data preparation time. According to various embodiments, the ground truths may be obtained by manual scene labeling or, for example if a LIDAR sensor is available in the data collecting vehicle, a semi automatic approach may be provided. First, the LIDAR detections 102 may be stacked for the entire log (recorded continuous drive) duration using satellite-based radio navigation data (like GPS (Global Positioning System)) to obtain stacked LIDAR scans and GPS data 106. In a second step, a ground removal method may reject the irrelevant detections belonging to the road surface. In a further step, a filtering method may remove moving objects. The result may be an accumulated LIDAR OG map 108. The obtained 2D bird view map may be very efficiently labeled manually with vector graphic tools as it is required to be done only once for a whole scenario.

Data 116, which includes both data (the radar patches and the image patches) and the labels (based on the accumulated LIDAR OG map 108) may be used to train the neural network 122, like indicated by arrow 126. The inference (i.e. the use of the trained artificial neural network) may be performed for every new sensors readout 120, like indicated by arrow 128. Every new sensors readout 120 may include radar patches and image patches, which may be sliced into patches. Slicing may refer to cutting out data patches around each radar detection from the global birds view image. The patches of the NN (neural network) output may be recast onto the output map 124 with a weighting method for points which are present in several patches and are predicted by more than one network inference, like indicated by arrow 130.

It will be understood that if the NN 122 would be used for input data 120 which is in the training data, i.e. for which a situation according to a LIDAR GT (ground truth) 118 is present, the map 124 determined based on the NN output and the LIDAR GT 118 may be similar or identical.

A Pandora LIDAR (with 5 cameras) and 6×SRR4 radars may be used.

Figure 2A:
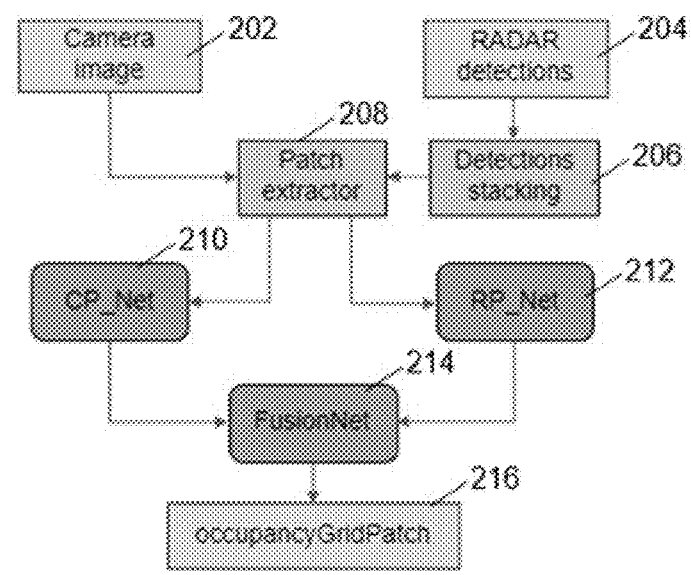
FIG. 2A an illustration of a low level camera-radar fusion network for occupancy grid determination according to various embodiments.

FIG. 2A shows an illustration 200 of a low level camera-radar fusion network for occupancy grid determination according to various embodiments. For example, front radar and camera data may be used. The camera image 202 and the radar detections 204, after the detections are stacked by module 206, may be provided to a patch extractor 208. The patch extractor 208 may receive stacked radar detections and camera images 202 as input, and may provide patches to the camera patch network 210 and the radar patch network 212.

Data provided by each sensor network (CP Net—camera patch network 210, RP Net—radar patch network 212) may be fused using a fusion network 214, in order to determine the occupancy grid patch 216. The low level camera-radar fusion network shown in FIG. 2A may also be referred to as late low level fusion network as both data channels (camera and radar) are processed separately in the first stage (by the camera patch network 210, and by the radar patch network 212, respectively), and the fusion is done in the later stage (by the fusion network 212). Fusion as illustrated in FIG. 2A is still a low level fusion network because there is no fusion of two occupancy grid maps, but features extracted by the both previous networks (by the camera patch network 210, and by the radar patch network 212, respectively). The camera patch network 210 and the radar patch network 212 may be trained on raw sensor data which was not processed before by any other method or algorithm, and all three sub networks (the camera patch network 210, the radar patch network 212, and the fusion network 214) may be trained at once.

A rectangular grid size (W×H) of 61×61 cells (with size of each cell 0.1 m×0.1 m) covering a 6×6 m patch around each radar detection may be used. The stacking history for radar may be set to 5 samples recorded at a frequency of 10 samples per second with detection present (for example, an indication whether an object is potentially present) and detection speed (for example a speed of a potential object) as features. For the camera, only one image with RGB color space may be used (in other words: the camera images may not be stacked in (or over) time).

Figure 2B:
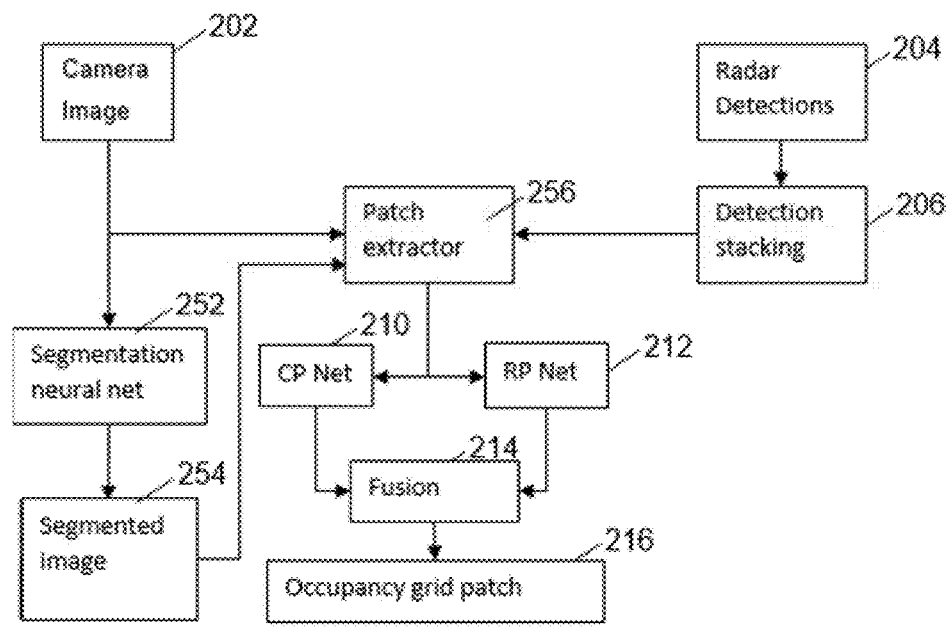
FIG. 2B an illustration of a low level camera-radar fusion network for occupancy grid determination according to various embodiments.

FIG. 2B shows an illustration 250 of a low level camera-radar fusion network for occupancy grid determination according to various embodiments. Various elements shown in FIG. 2B may be similar or identical to elements shown in FIG. 2A, so that the same reference signs may be used and duplicate description may be omitted.

Similar to the patch extractor 208 shown in FIG. 2A, the patch extractor 256 shown in FIG. 2B may receive stacked radar detections and camera images 202 as input, and may provide patches to the camera patch network 210 and the radar patch network 212. Furthermore, the patch extractor 256 may receive as input data a segmented image 254, which may be determined based on the camera image 202 using a neural network, which may be referred to as segmentation neural network 252.

The segmentation neural network 252 may carry out the high level segmentation of the original image. The segmentation image (in other words: segmented image 254) may then also be processed by the patch extractor 256 in order to cut a patch around each object detection (similar as from original image 202).

The segmentation image, which may for example be provided in RGB (red-green-blue) or grayscale, may then be concatenated with the original image RGB channels (in other words: the RGB channels of the camera image 202) in order to obtain an RGBC image, where C is the object class channel. For example, the object class channel may include a pre-defined value for each class of object.

The segmentation neural network 252 may improve the determination of the (occupancy grid) patch because it may contain the high level understanding of a scene (since each object class is marked as different color) as well as improve the sharpness of the edges in a given occupancy grid map.

Figure 3:
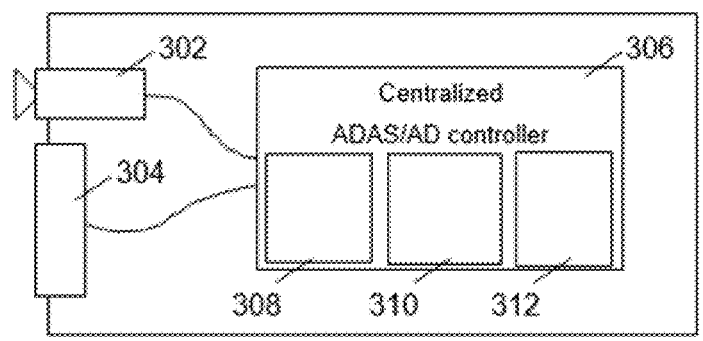
FIG. 3 an illustration of a hardware implementation of a low-level fusion occupancy grid determination method in a centralized ADAS/AD controller according to various embodiments.

FIG. 3 shows an illustration 300 of a hardware (HW) implementation of a low-level fusion occupancy grid determination method in a centralized ADAS/AD controller 306 according to various embodiments.

For the level fusion method according to various embodiments, both the camera data (from a camera 302) and radar data (from a radar sensor 304) are received by a single unit, for example the centralized ADAS/AD controller 306. Because forming the image patch requires the knowledge of radar patches, it may be difficult to implement the initial neural network processing separately in both sensors. The centralized ADAS/AD controller 306 may receive both raw radar and camera stream and may have enough processing capabilities to be able to perform the NN inference.

The number of detections may be limited in the radars (for example to 64 by CAN connection, or 128 by Ethernet connection), so that all patches for a given radar may be formed into one big batch, which may improve the inference time on the dedicated accelerator. A batch is a memory organization unit which allows processing all data at once (for example by removing the need of multiple CPU-GPU (central processing unit-graphics processing unit) transfers) and additionally allows for computation time optimization.

The number of required computation may be decreased by creating patches not for every radar detection, but rather by dividing the whole detection map into the grid of a patch size. This may result in multiple radar detections belonging to one grid patch. The final processing may require inferring only grid patches that actually have the radar detections within them.

According to various embodiments, the NN patch processing allows to limit the number of computations required and does not require processing of sparse data which in turn allows for efficient computation in the centralized ADAS/AD controller 306.

The centralized ADAS/AD controller 306 may include a module 308 for patch preparation and stacking, a module 310 for batch forming, and a module 312 for inferring of the neural network.

Figure 4:
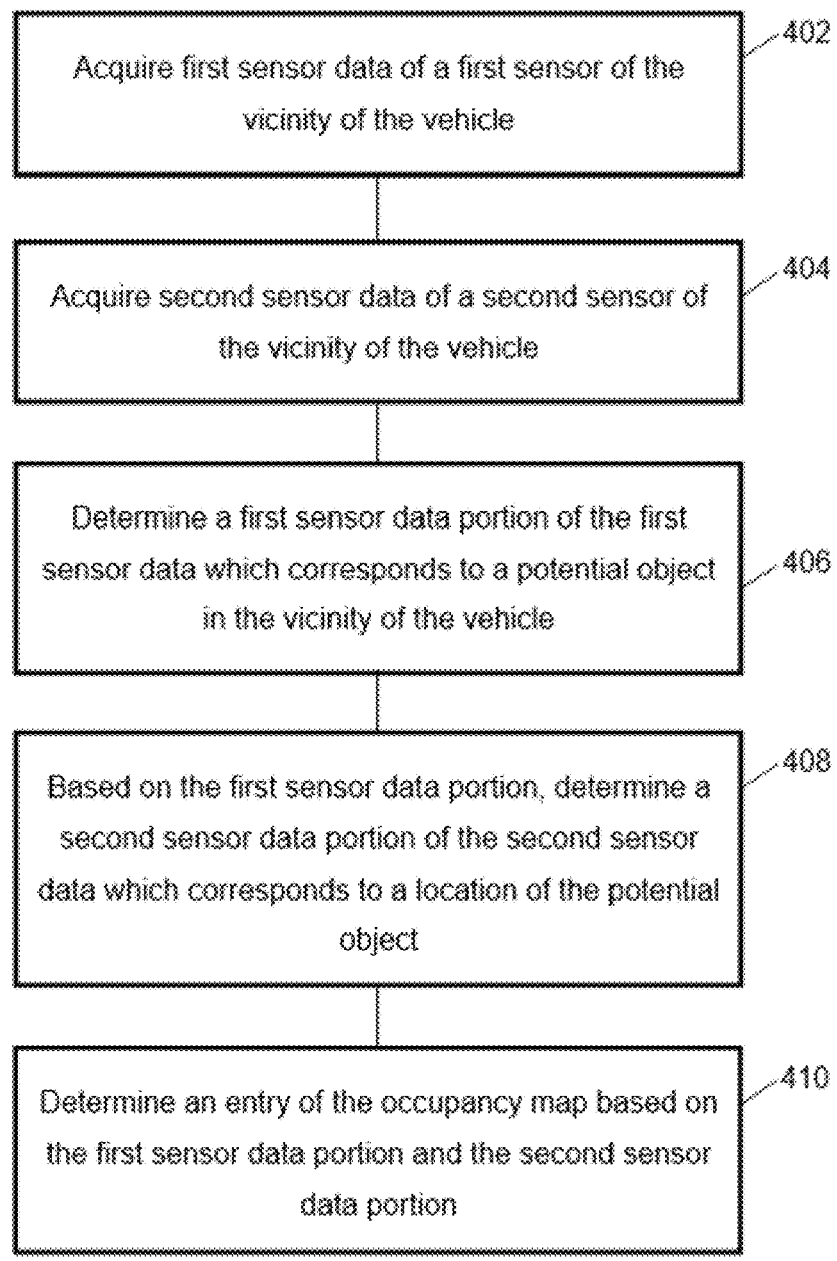
FIG. 4 a flow diagram illustrating a method for determining an entry of an occupancy map of a vicinity of a vehicle according to various embodiments.

FIG. 4 shows a flow diagram 400 illustrating a method for determining an entry of an occupancy map of a vicinity of a vehicle according to various embodiments. At 402, first sensor data of a first sensor of the vicinity of the vehicle may be acquired. At 404, second sensor data of a second sensor of the vicinity of the vehicle may be acquired. At 406, a first sensor data portion of the first sensor data which corresponds to a potential object in the vicinity of the vehicle may be determined. At 408, a second sensor data portion of the second sensor data which corresponds to a location of the potential object may be determined based on the first sensor data portion. At 410, an entry of the occupancy map may be determined based on the first sensor data portion and the second sensor data portion.

According to various embodiments, the first sensor may include or may be a radar sensor. According to various embodiments, the second sensor may include or may be a camera.

According to various embodiments, the first sensor data may include or may be a plurality of measurements of the first sensor stacked over time or a plurality of measurements of the first sensor which have been processed by a first neural network and stacked over time, and the second sensor data may include or may be a plurality of measurements of the second sensor stacked over time or a plurality of measurements of the second sensor which have been processed by a second neural network and stacked over time.

According to various embodiments, the method may further include: determining a segmented image based on the second sensor data; and determining a segmented image portion of the segmented image. The entry of the occupancy map may be determined further based on the segmented image portion.

According to various embodiments, the segmented image may be determined using a third neural network.

According to various embodiments, the first sensor data portion may include or may be a first sensor patch of a pre-determined first sensor data portion size, and the second sensor data portion may include or may be a second sensor patch of a pre-determined second sensor data portion dimension size.

According to various embodiments, the first sensor data portion size and the second sensor data portion size may be multi-dimensional data with identical size in at least one dimension.

According to various embodiments, the multi-dimensional data may include dimensions related to time, width, height, and features, wherein the multi-dimensional data of the first sensor data portion size and the multi-dimensional data of the second sensor data portion have identical size in the dimensions related to width and height.

According to various embodiments, the second sensor data portion may be determined so that an area in the vicinity of the vehicle covered by the second sensor data portion is related to an area in the vicinity of the vehicle covered by the first sensor data portion.

According to various embodiments, the second sensor data portion may be determined based on mapping corner points of the first sensor data portion to the second sensor data.

According to various embodiments, wherein the second sensor data portion may be determined based on mapping every point of the first sensor data portion to the second sensor data.

According to various embodiments, the entry of the occupancy map may be determined using an artificial neural network based on the first sensor data portion and the second sensor data portion.

According to various embodiments, the artificial neural network may be trained based on at least one of manually labelled occupancy grid map data or based on occupancy grid map data determined based on a third sensor.

Each of the steps 402, 404, 406, 408, 410 and the further steps described above may be performed by computer hardware components.

What is claimed is:

1. A computer-implemented method comprising:
   determining, using computer hardware components, an entry of an occupancy map of a vicinity of a vehicle by:
   acquiring first sensor data of a first sensor in the vicinity of the vehicle;
   acquiring second sensor data of a second sensor in the vicinity of the vehicle;
   determining, based on the second sensor data, a segmented image using a segmentation neural network that determines an object class feature for each segment of the segmented image;
   determining a first sensor patch of a pre-determined first sensor patch size from the first sensor data, the first sensor patch corresponding to a potential object in the vicinity of the vehicle;
   based on the first sensor patch and the segmented image, determining a second sensor patch of a pre-determined second sensor patch size from the second sensor data, the second sensor patch corresponding to a location of the potential object;
   extracting features of the first sensor patch;
   extracting features of the second sensor patch including an object class feature for the second sensor patch; and
   determining the entry of the occupancy map that corresponds to the potential object by fusing the features of the first sensor patch and the second sensor patch using a fusion artificial neural network.

2. The computer implemented method of claim 1, wherein the first sensor comprises a radar sensor.

3. The computer implemented method of claim 2, wherein the second sensor comprises a camera.

4. The computer implemented method of claim 1, wherein at least one of:
   the first sensor data comprises a plurality of measurements of the first sensor stacked over time; or
   the second sensor data comprises a plurality of measurements of the second sensor stacked over time.

5. The computer implemented method of claim 1, wherein the first sensor patch and the second sensor patch are multi-dimensional with identical size in at least one dimension.

6. The computer implemented method of claim 5,
   wherein the first sensor patch and the second sensor patch have dimensions related to time, width, height, and features; and
   wherein the first sensor patch and the second sensor patch have identical size in the dimensions related to width and height.

7. The computer implemented method of claim 1, wherein the second sensor patch is determined so that an area in the vicinity of the vehicle covered by the second sensor patch is related to an area in the vicinity of the vehicle covered by the first sensor patch.

8. The computer implemented method of claim 7, wherein the second sensor patch is determined based on mapping corner points of the first sensor patch to the second sensor data.

9. The computer implemented method of claim 7, wherein the second sensor patch is determined based on mapping every point of the first sensor patch to the second sensor data.

10. The computer implemented method of claim 7,
    wherein the second sensor patch is determined based on mapping corner points of the first sensor patch to the second sensor data; and
    wherein the second sensor patch is determined based on mapping every point of the first sensor patch to the second sensor data.

11. The computer implemented method of claim 1, wherein the fusion artificial neural network is trained based on manually labelled occupancy grid map data.

12. The computer implemented method of claim 1, wherein the fusion artificial neural network is trained based on occupancy grid map data determined based on a third sensor.

13. A system comprising computer hardware, the computer hardware being configured to:
acquire first sensor data of a first sensor in a vicinity of a vehicle;
acquire second sensor data of a second sensor in the vicinity of the vehicle;
determine, based on the second sensor data, a segmented image using a segmentation neural network that determines an object class feature for each segment of the segmented image;
determine a first sensor patch of a pre-determined first sensor patch size from the first sensor data, the first sensor patch corresponding to a potential object in the vicinity of the vehicle;
based on the first sensor patch and the segmented image, determine a second sensor patch of a per-determined second sensor patch size from the second sensor data, the second sensor patch corresponding to a location of the potential object;
extract features of the first sensor patch;
extract features of the second sensor patch including an object class feature for the second sensor patch; and
determine an entry of an occupancy map that corresponds to the potential object by fusing the features of the first sensor patch and the second sensor patch using a fusion artificial neural network.

14. The system of claim 13, further comprising:
the vehicle;
the first sensor; and
the second sensor.

15. The system of claim 13,
wherein the first sensor comprises a radar sensor; and
wherein the second sensor comprises a camera.

16. A non-transitory computer-readable medium comprising instructions that when executed configure computer hardware to:
acquire first sensor data of a first sensor in a vicinity of a vehicle;
acquire second sensor data of a second sensor in the vicinity of the vehicle;
determine, based on the second sensor data, a segmented image using a segmentation neural network that determines an object class feature for each segment of the segmented image;
determine a first sensor patch of a pre-determined first sensor patch size from the first sensor data, the first sensor patch corresponding to a potential object in the vicinity of the vehicle;
based on the first sensor patch and the segmented image, determine a second sensor patch of a pre-determined second sensor patch size from the second sensor data, the second sensor patch corresponding to a location of the potential object;
extract features of the first sensor patch;
extract features of the second sensor patch including an object class feature for the second sensor patch; and
determine an entry of an occupancy map that corresponds to the potential object by fusing the features of the first sensor patch and the second sensor patch using a fusion artificial neural network.

17. The computer implemented method of claim 1, wherein determining the first sensor patch comprises cutting the first sensor patch out of the first sensor data, the cutting based on centering the first sensor patch of the pre-determined first sensor patch size around a location of the potential object.

18. The computer implemented method of claim 1, wherein the location of the potential object comprises a radar detection.

19. The system of claim 13, wherein the first sensor patch and the second sensor patch are multi-dimensional with identical size in at least one dimension.

20. The system of claim 19, wherein:
the first sensor patch and the second sensor patch have dimensions related to time, width, height, and the features; and
the first sensor patch and the second sensor patch have identical size in the dimensions related to width and height.

* * * * *